F. H. PIERPONT.
MEASURING INSTRUMENT.
APPLICATION FILED JULY 18, 1906.
904,560.
Patented Nov. 24, 1908.
3 SHEETS—SHEET 3.
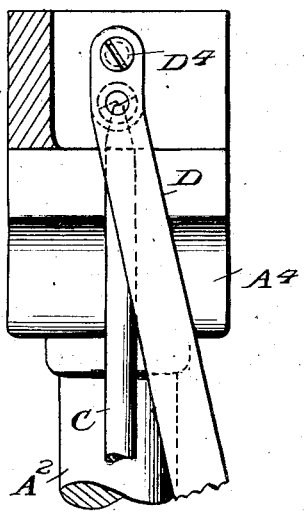
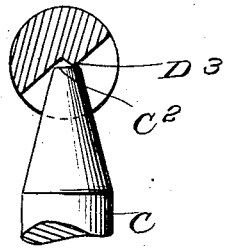
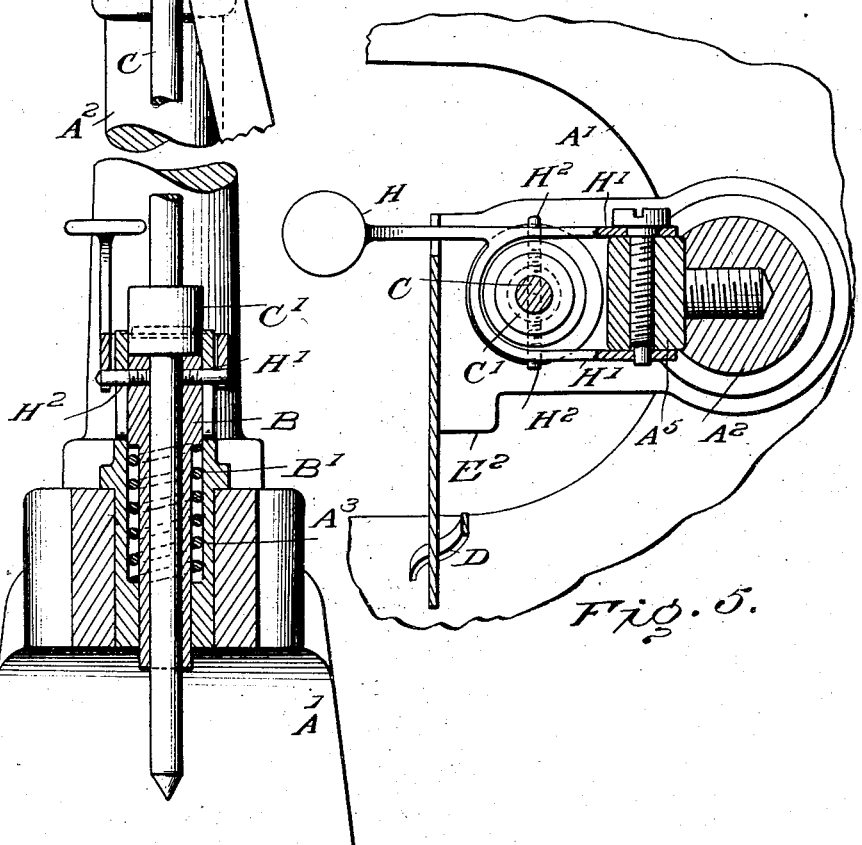
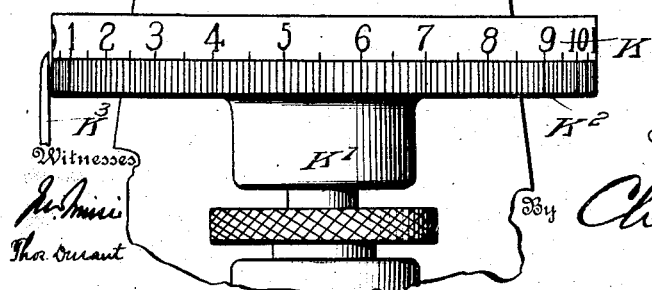
Witnesses
Inventor
Frank Hinman Pierpont,
By Church & Church
his Attorneys

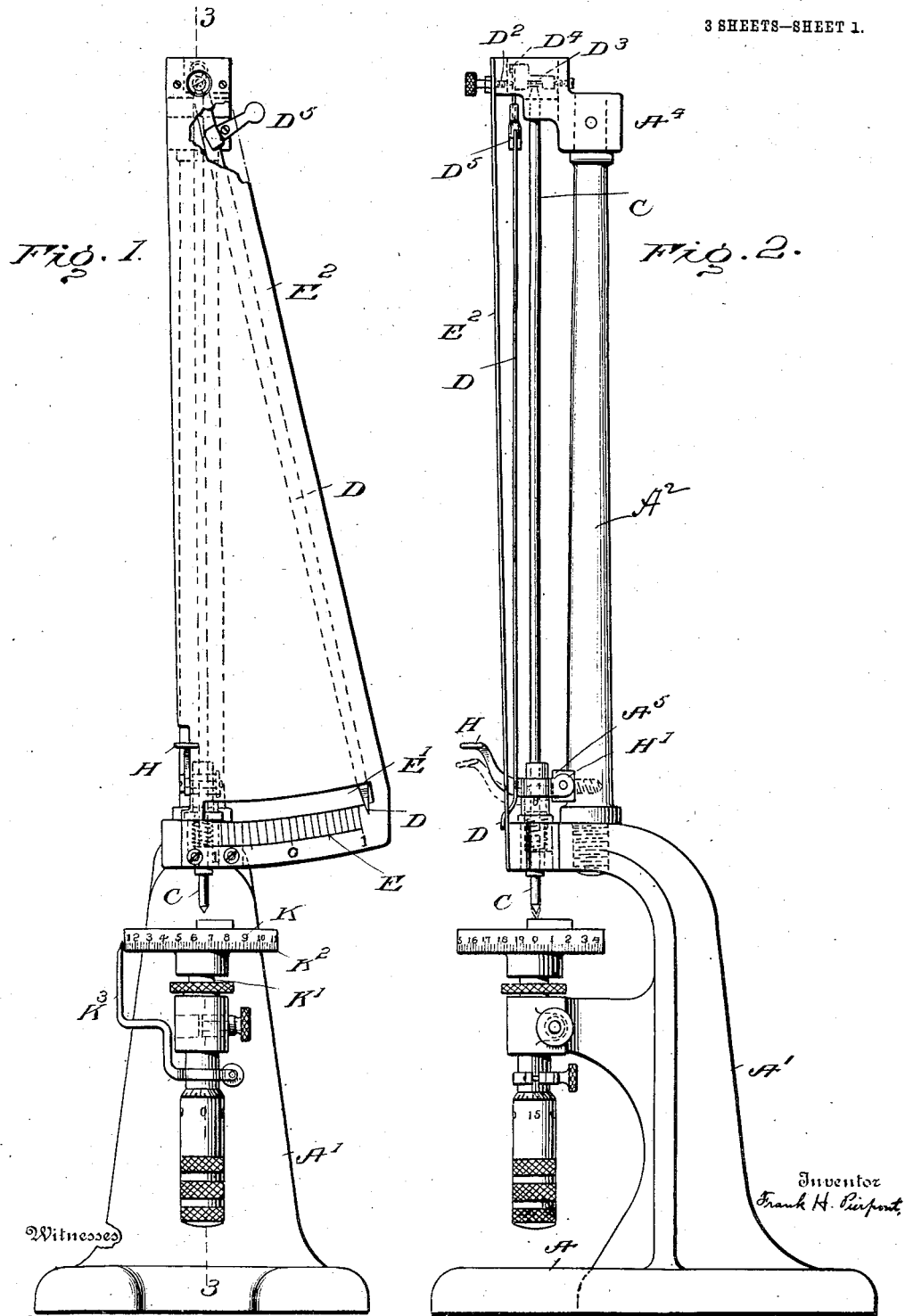

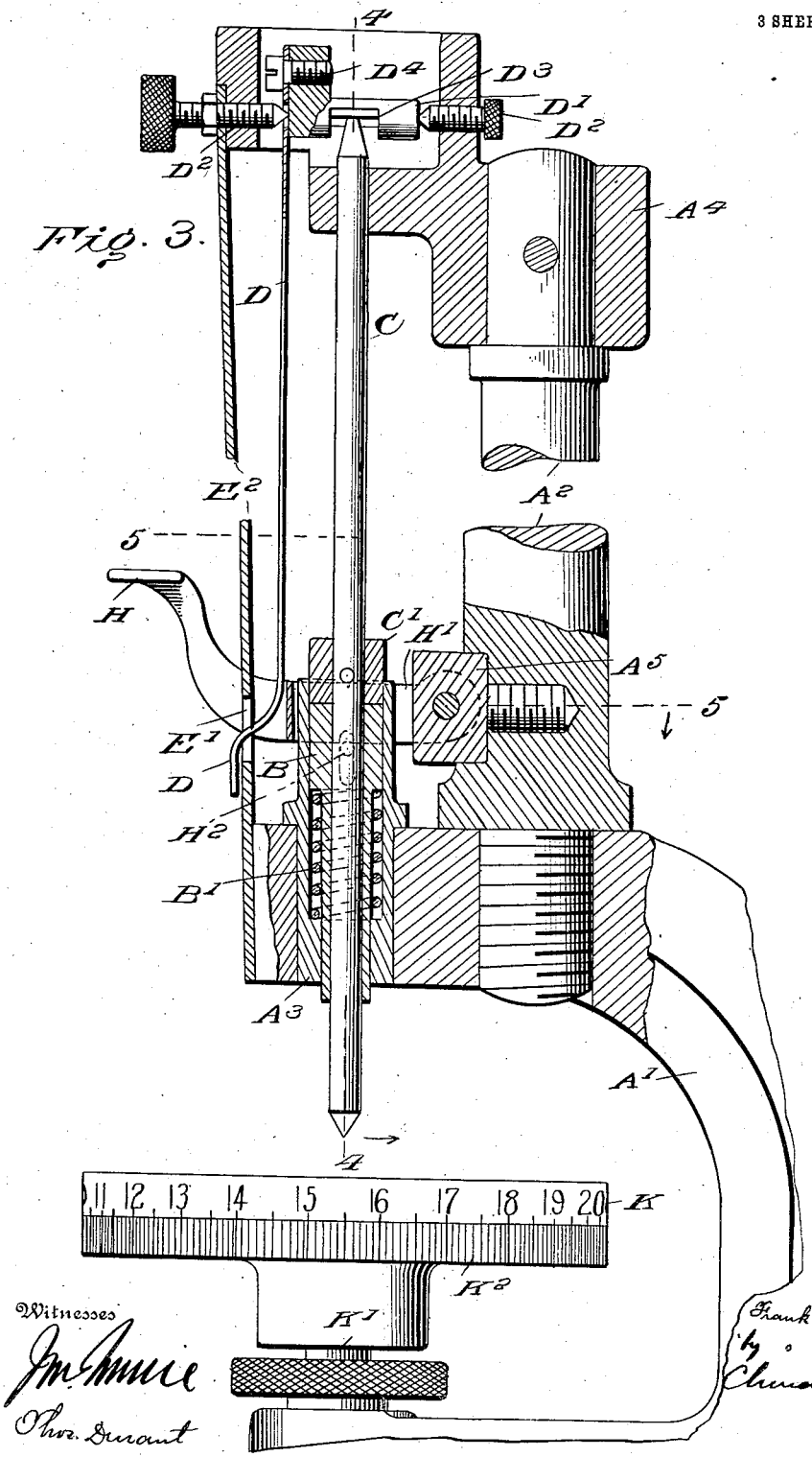

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

MEASURING INSTRUMENT.

No. 904,560.   Specification of Letters Patent.   Patented Nov. 24, 1908.

Application filed July 18, 1906. Serial No. 326,749.

*To all whom it may concern:*

Be it known that I, FRANK HINMAN PIERPONT, a citizen of the United States, residing at Horley, in the county of Surrey, England, have invented certain new and useful Improved Measuring Instruments; and I do hereby declare the following to be a full, clear, and exact description of the same, reference being had to the accompanying drawings, forming a part of this specification, and to the figures and letters of reference marked thereon.

This invention relates to an improved measuring instrument, and has for its object to provide a simple and effective instrument which shall register on a scale, readily readable by the naked eye, micrometrical differences in dimension.

In carrying out the invention a rod movable endwise is operatively connected to an index arm by means of a knife-edge member so that the movements of the rod are communicated to the index arm.

A feature of the invention is the provision with the endwise movable rod so arranged as to tend to move towards the object to be measured of a spring or weight normally opposing such tendency and a manual control device whereby the action of the spring or weight is neutralized to permit the rod to approach and abut against the object to be measured.

A measuring instrument according to this invention may comprise a support for the body to be measured, a scale of which each division represents say, for example, one twenty-thousandth of an inch, an index arm, pivoted at one end while its other end is formed as an index-pointer positioned in front of the scale, and a rod, the latter arranged so that one end tends to engage a surface of a body on the support, while its other end is operatively connected by a knife-edge to the index-arm so that endwise movement of the rod will swing the arm and move its index point across the scale.

A preferred construction of a measuring instrument embodying the invention will now be described by way of example with reference to the accompanying drawings, of which Figure 1 is a front view, and Fig. 2 is a side view of a complete instrument. Fig. 3 is a section on an enlarged scale taken on the line 3—3 of Fig. 1. Fig. 4 is a section taken on the line 4—4 of Fig. 3, parts being broken away. Fig. 5 is a section on the line 5—5 of Fig. 3, and Fig. 6 is a detail.

Like reference signs indicate like parts in all figures.

The frame of the instrument comprises a bed plate A and a standard $A^1$, of which the top is curved over towards the front, and has screwed into it a vertical post $A^2$. In front of the post the standard is bored to receive a bushing $A^3$, which forms a bearing for a retractor or sleeve B, yieldingly supported therein by a spring $B^1$.

A vertical rod C is carried in the sleeve, so as to be capable of endwise movement therein, and is normally held in a determined position by means of a block $C^1$, pinned or otherwise secured thereto and resting on the top of the sleeve. The upper portion of the rod is supported by a bearing in a horizontal portion of a bracket $A^4$ fixed on to the top of the post $A^2$.

The top of the rod is preferably formed as a truncated cone (see Fig. 6) and its flat upper surface $C^2$ supports a knife edge $D^3$ carried eccentrically on a short horizontal rocking-spindle $D^1$ constituting a multiplying member of which the ends are pivotally supported by screw pins $D^2$ mounted in vertical portions of the bracket $A^4$. Preferably the knife edge $D^3$ is formed by cutting away a portion of the rocking spindle as shown best in Fig. 6.

Secured on to the front end of the spindle $D^1$, say by a screw $D^4$ is an arm D, hereinafter called the "index arm". Conveniently the spindle is provided as shown in the figures with an upward projection or lug to receive the screw $D^4$. The index arm is curved outwardly at its lower end to pass through a slot $E^1$ formed in a plate $E^2$ secured on the instrument frame. Beneath the slot is arranged a scale E, over which the end of the index arm, shaped as a pointer is arranged to vibrate when the index arm is swung. A key H is provided which ends as a fork, passing on either side of the upper end of the bushing $A^3$, the ends of the fork arms being pivoted on to a block $A^5$ fixed on the post $A^2$. The arms $H^1$ of the fork rest on pins $H^2$ projecting from the sleeve B, slots being formed in the bushing for the passage of the pins, so that pressure on the key compresses the spring and allows the rod C to descend.

The bottom of the rod C ends in a point, and below the rod is a table or support K for the object to be measured. The table is supported by a micrometer screw device K¹ of known construction, carried in a lug extending from the standard A¹. The edge of the table may be provided with an index K², and a pointer K³ may be provided adjustably mounted on the screw device.

A light weight D⁵ may be adjustably clamped on the index-arm to insure that the arm exactly and readily follows the movements of the vertical rod, if the weight of the arm be deemed not sufficient for this purpose.

The index-arm is so proportioned that a vertical movement of the rod one twenty-thousandth of an inch in extent will cause the pointer of the index-arm to swing through an arc of a circle of, say, approximately one-eighth of an inch, and the scale is marked with divisions each representing one such movement, the center division being marked zero, so that the instrument may indicate variations of one or more such lengths of movement above and below a standard.

Preferably the spring B¹ is so proportioned that the index pointer is normally held, as shown in Fig. 1, clear of the scale.

It is evident that the length of the arc through which the pointer moves depends on the length of the arm, and that both the size of the scale divisions and the amount of vertical movement they represent may be varied as convenient.

The instrument is operated as follows— Say that it is desired to measure a series of bodies one quarter of an inch thick. The operator by means of the key H compresses the spring B¹ thereby withdrawing retractor B and allowing the rod C to descend, and at the same time positions the table, as that when the end of the rod rests thereon the index-arm pointer is at zero on the scale. The key is now released and the rod returns to normal, while by means of the micrometer screw K¹ the table is lowered one quarter of an inch. The body to be measured is now placed on the table underneath the rod. The operator again lowers the key H, and the rod advances automatically until it rests on the upper surface of the body to be measured. If this is correctly proportioned the index-arm pointer will again stop at zero, while any discrepancy above or below that amount will be registered on the scale in twenty-thousandths of an inch. By moving the body about on the table, any portion of its surface can be tested.

It is evident that the construction of the instrument may be varied in many details without departing from the spirit of the invention. For instance, a weight might be employed in place of the spring B¹, and although the instrument hereinbefore described is a vertical one, it might be arranged with a horizontal rod and index-arm, these two parts being controlled entirely by springs instead of by gravity in one direction as in the hereinbefore described instrument.

Having thus described my invention what I claim new and desire to secure by Letters Patent, is:—

1. In a measuring instrument of the character described, the combination of the following elements, to wit; a supporting surface or table; a gravitating measuring rod perpendicular to said supporting surface provided with an engaging surface and a shoulder; a multiplying member pivotally supported and provided with a knife edge contact located to one side of its axis and in the line of movement of said engaging surface; and a spring actuated retracting member contacting with the shoulder on the measuring rod and movable longitudinally of the latter independently of said rod.

2. In a measuring instrument such as described the combination with the measuring member, indicator and intermediate multiplying devices, of a spring actuated retractor for returning the measuring member to initial position, said retractor contacting with the measuring member in one direction only and means for effecting the withdrawal of the retractor in the direction of the advance of the measuring member to deposit the latter upon the surface to be measured without pressure other than that due to its own weight.

3. In a measuring instrument such as described, the combination of the following elements, to wit; a support or table provided with micrometer adjusting devices; a measuring member automatically impelled towards said support and provided with a shoulder; a spring operated retractor arranged to contact with the shoulder on said measuring member and to be withdrawn from engagement therewith; and a lever coupled with said retractor and operating to withdraw the latter in the direction of the advancing movement of the measuring member and out of contact with the shoulder thereon.

4. In a measuring instrument such as described, the combination of the following elements, to wit; a gravitating measuring member, a spring actuated retractor operating upon said measuring member to return the latter and sustain it in normal position; an oscillating multiplying member provided with an engaging bearing to one side its axis of oscillation and in the path of movement of said measuring member; an index hand coupled with said oscillating multiplying member; and a counterweight coupled with said multiplying member and operating to maintain contact between its engaging bearing and the measuring member.

5. In a measuring instrument such as described, the combination of the following elements, to wit; an automatically impelled measuring member; multiplying devices connected therewith; a gravitating index coupled with said multiplying devices; and a yieldable retractor engaging said measuring member and separable therefrom to permit the latter to be deposited upon the surface to be measured under the pressure of its impelling means alone.

6. In a measuring instrument such as described the combination of the following elements, to wit; a supporting frame; a multiplying member supported to oscillate upon pivots and provided with a knife edge bearing located to one side of its axis of oscillation; an index arm secured to said multiplying member; a measuring rod perpendicular to and in position to engage said knife edge bearing said rod being movable longitudinally in a fixed bearing and provided with a shoulder; a retractor in the form of a sleeve surrounding said measuring rod and forming a bearing therefor, said sleeve engaging the shoulder carried by the rod; a spring connected to said sleeve and operating in a direction to retract the rod; and a lever engaging said retractor to move the latter in opposition to the spring out of engagement with the shoulder on the measuring rod.

FRANK HINMAN PIERPONT.

Witnesses:
EUSTACE H. BURKE,
JOHN J. NEWPORT.